Oct. 16, 1928.
C. M. C. BARRETT
1,688,293
DOUBLE SWIVEL HOOK
Original Filed Sept. 9, 1925
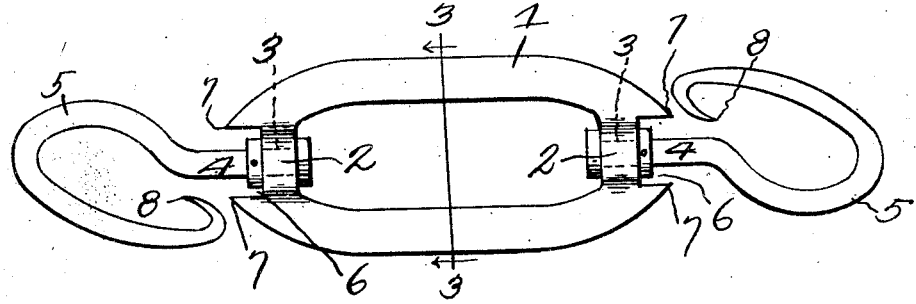
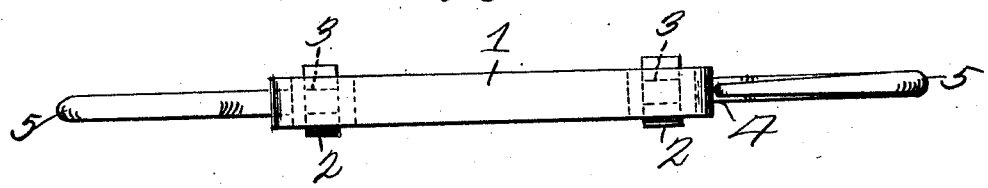
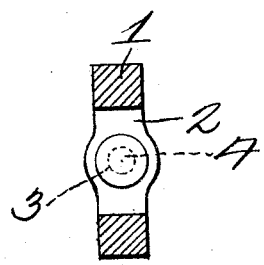
Inventor
C. M. C. Barrett
By Swift
Attorney Patented Oct. 16, 1928.

1,688,293

UNITED STATES PATENT OFFICE.

CASSIUS M. C. BARRETT, OF COUPEVILLE, WASHINGTON.

DOUBLE-SWIVEL HOOK.

Application filed September 9, 1925, Serial No. 55,316. Renewed August 14, 1928.

The invention relates to double swivel hooks, and has for its object to provide a device of this character particularly adapted for use in logging camps and for rigging generally comprising an elongated body member having recesses in its ends and swivelled hooks at opposite ends of the body member and having their shanks rotatably mounted in the transverse portions forming the ends of the body member.

A further object is to provide in the ends of the hooked portions of the hook inwardly extending hooks terminating adjacent the shanks of the hooks and adjacent the recesses in the ends of the body member, said hooked portions of the hook forming means for preventing a rope passing through the hooks from becoming easily disengaged, when slack is allowed in the rope. The recesses form oppositely disposed arms for additionally preventing the rope from coming out of the hook.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a plan view of the swivel hook.

Figure 2 is a side elevation of the swivel hook.

Figure 3 is a transverse sectional view through the hook taken on line 3—3 of Figure 1.

Referring to the drawing, the numeral 1 designates the elongated body member of the hook, the end transverse portions 2 of which are provided with axial bearings 3, in which are rotatably mounted the shanks 4 of the hooks 5, therefore it will be seen that the hooks 5 are swivelly connected to the body 1, and will easily rotate independent of each other, thereby allowing kinks or twists in a rope to work out of the same, or where the device is used in a hoisting operation, an article being hoisted may be rotated without placing twists in the rope or hoisting cable. The ends of the body member 1 are provided with recesses 6, thereby forming outwardly extending arms 7 at opposite sides of the shanks 4 of the hooks. It will be noted the hooks 5 terminate adjacent the arms 7 and are provided with inwardly extending hooks 8 which terminate adjacent the outer ends of the shanks 4, and which hooks prevent ropes or cables from easily becoming disengaged from the hooks 5 during a hoisting operation, and when the hooks are in the position shown in Figure 1, the arms 7 further assist in preventing disengagement of the rope or cable when there is slack in the rope. The device is particularly designed for use in logging camps, however it is to be understood it is applicable to general use in connection with rigging of various kinds. It will also be seen that the parts are reduced to a minimum and the swivel hooks 5 have independent movement in relation to each other, thereby allowing twists to easily work out of a rope and a guide line may be attached to the body member 1 whereby during a hoisting operation a boom may be swung without interfering with the operation of the hook.

The invention having been set forth what is claimed as new and useful is:—

A double swivelled hook for rigging, said hook comprising a body member having an opening therethrough thereby allowing a line to be attached thereto, hooks at opposite ends of the body member, shanks carried by said hooks in axial alinement and rotatably mounted in bearings in the ends of the body member, arms carried by the ends of the body member at opposite sides of the shanks, thereby forming recesses, collars on said shanks within the recesses, said hooks terminating in inwardly extending hooks disposed adjacent the outer ends of the arms when the hooks are in the plane of the body member.

In testimony whereof I have signed my name to this specification.

CASSIUS M. C. BARRETT.